(12) United States Patent
Ookawa (10) Patent No.: US 6,353,223 B1
(45) Date of Patent: Mar. 5, 2002

(54) INFRARED CAMERA

(75) Inventor: Norio Ookawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/374,506

(22) Filed: Aug. 16, 1999

(30) Foreign Application Priority Data

Sep. 10, 1998 (JP) .......................................... 10-256722

(51) Int. Cl.$^7$ ................................. G01J 5/02; G01J 5/06
(52) U.S. Cl. ................ 250/330; 250/252.1; 250/339.09; 250/339.04
(58) Field of Search ............................. 250/330, 332, 250/252.1, 339.02, 339.03, 339.04, 339.08, 341.5

(56) References Cited

U.S. PATENT DOCUMENTS

| | | |
|---|---|---|
| 5,286,976 A | 2/1994 | Cole |
| 5,420,419 A | 5/1995 | Wood |
| 5,548,329 A | 8/1996 | Klatt |
| 5,591,973 A * | 1/1997 | Massarik et al. ............ 250/332 |
| 5,650,622 A | 7/1997 | Ookawa et al. |
| 5,677,533 A * | 10/1997 | Yaktine et al. ............... 250/342 |
| 6,023,061 A * | 2/2000 | Bodkin ........................ 250/332 |
| 6,184,529 B1 * | 2/2001 | Contini ........................ 250/347 |

FOREIGN PATENT DOCUMENTS

| | | |
|---|---|---|
| EP | 0 647 064 A1 | 4/1994 |
| GB | 2 241 849 A | 9/1991 |
| JP | 2-206976 | 8/1990 |
| JP | 7-509057 | 10/1995 |
| JP | 10-142065 | 5/1998 |
| WO | WO 97/01926 | 1/1997 |

* cited by examiner

Primary Examiner—Constantine Hannaher
Assistant Examiner—Albert Gagliardi
(74) Attorney, Agent, or Firm—Burns, Doane, Swecker & Mathis, LLP (57) ABSTRACT

An infrared camera capable of automatically executing offset compensation so that fixed pattern noise is removed without the need of an operator comprises an offset compensation signal generation circuit and a shutter. The shutter is closed based on an offset compensation execution signal for carrying out offset compensation, the signal being automatically and periodically generated by the offset compensation signal generation circuit after execution of the first offset compensation.

12 Claims, 10 Drawing Sheets

INFRARED CAMERA

BACKGROUND OF THE INVENTION

1. Field of the Invention

The present invention relates to an infrared camera with offset compensation.

2. Description of the Related Art

Figure 9:
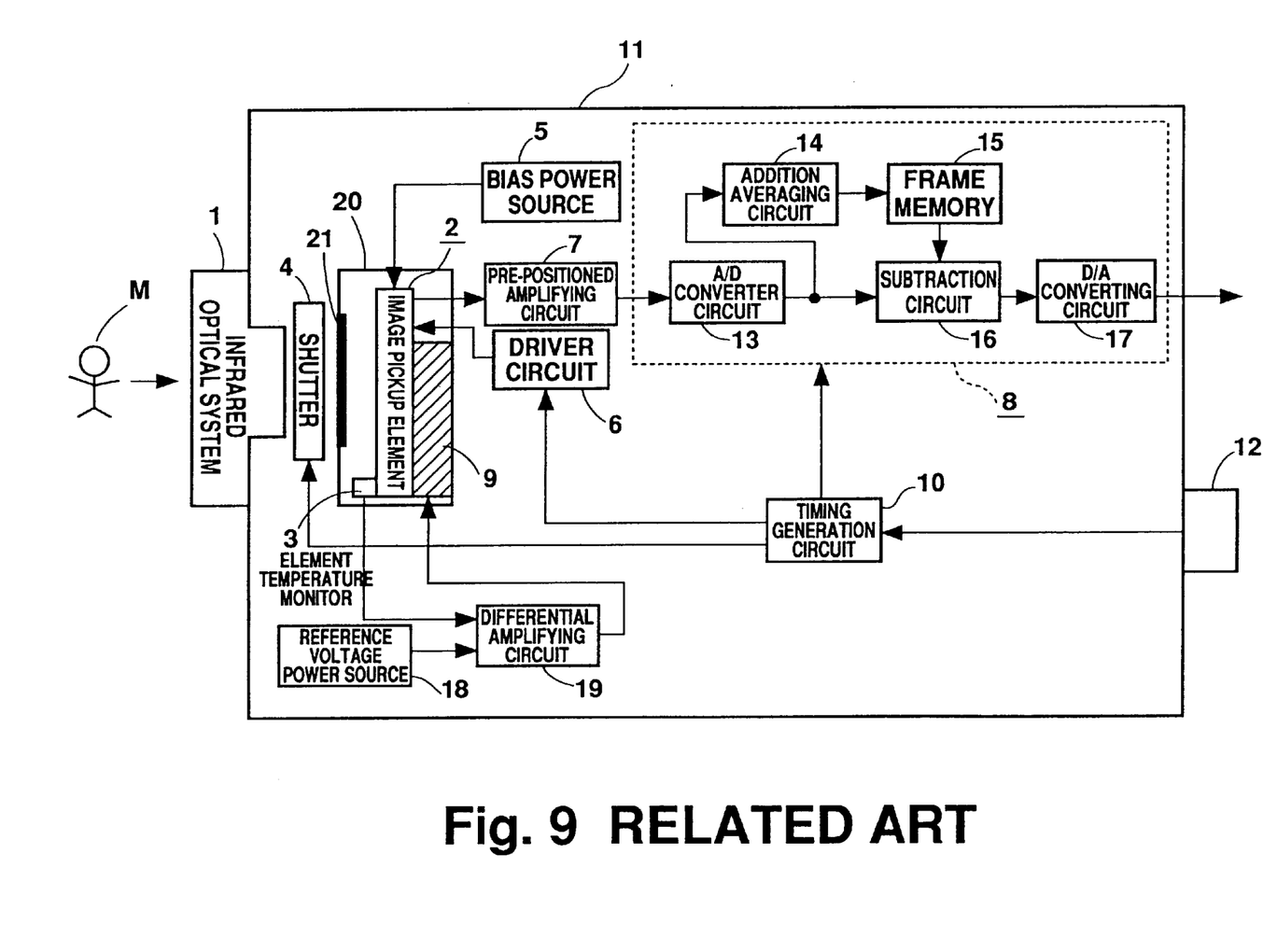
FIG. 9 is a block diagram showing a structure of an infrared camera according to the related art.

FIG. 9 is a block diagram relating to a conventional infrared camera. The drawing shows an subject M, an infrared optical system 1, an image pickup element formed on the imaging surface of the infrared optical system 1, an element temperature monitor 3 thermally connected to the image pickup element 2, a shutter 4 provided between the infrared optical system 1 and the image pickup element 2, a bias power source 5 connected to the image pickup element 2, a driver circuit 6 connected to the image pickup element 2, pre-positioned amplifying circuit 7 connected to the image pickup element 2, a display processing circuit 8 connected to the pre-positioned amplifying circuit 7, an element temperature stabilizing means 9 thermally connected to the image pickup element 2, a timing generation circuit 10 connected to the shutter 4, the driver circuit 6, and the display processing circuit 8, a body 11, an offset compensation execution switch 12 provided in the outside of the body 11 and connected to the timing generation circuit 10. The display processing circuit 8 comprises an A/D converter 13, an addition averaging circuit 14, a frame memory 15, a subtraction circuit 16, and a D/A converter 17. Also shown in FIG. 1 are a reference voltage power source 18, a differential amplifying circuit 19 connected to the element temperature monitor 3 and the reference voltage power source 18, a vacant element package 20 accommodating the image pickup element 2, the element temperature monitor 3, and the element temperature stabilizing means 9, and an infrared window 21 typically made of germanium, leaving a vacant space enclosed by the vacant element package 20 and the infrared window 21.

Figure 10:
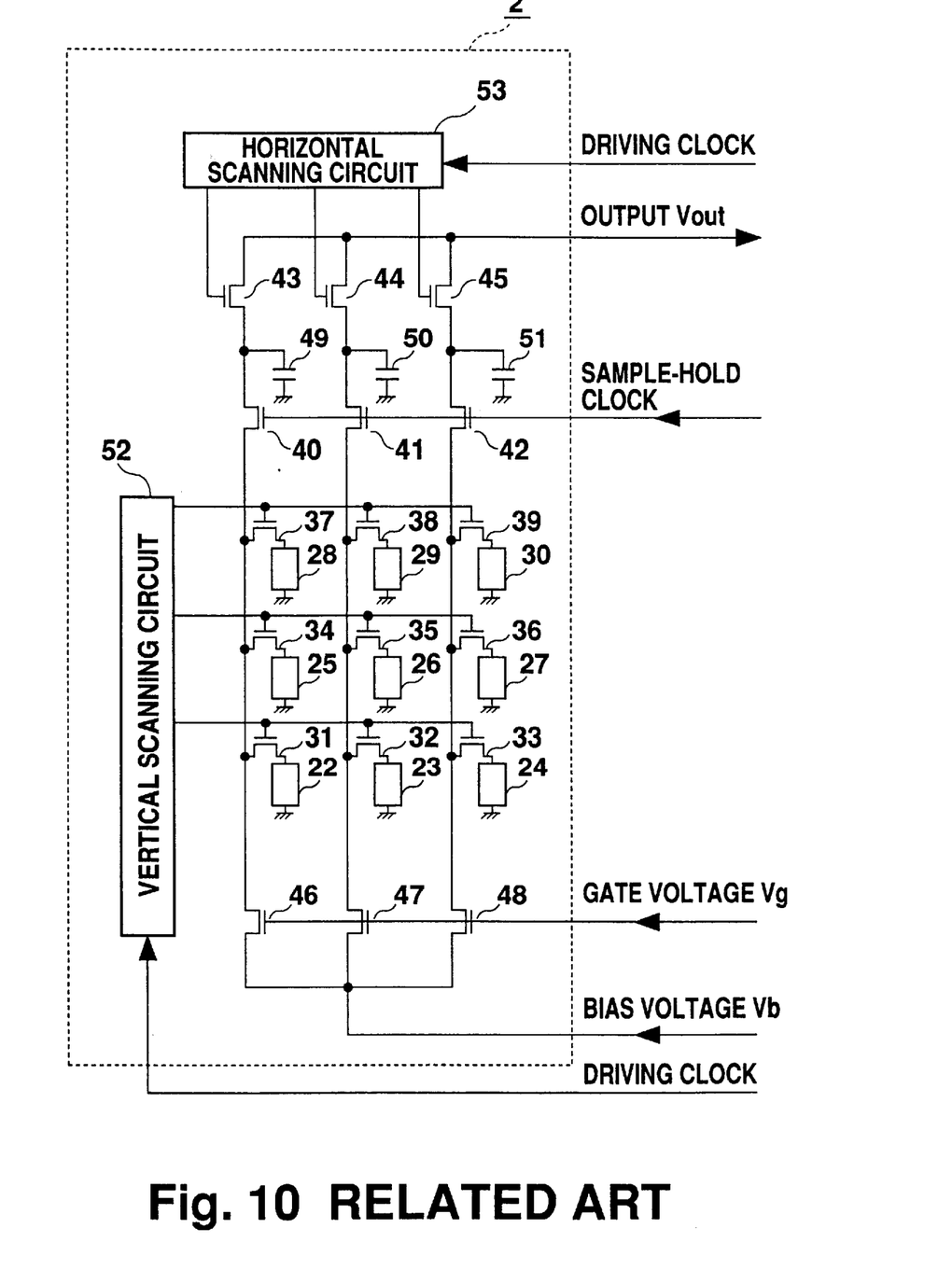
FIG. 10 is a diagram showing a structure of an image pickup element of an infrared camera according to the related art.

FIG. 10 shows an example structure of the image pickup element 2 which is, for the sake of brevity of explanation, comprised of 3×3 elements. The drawing shows infrared detectors 22 to 30, transistors 31 to 48, capacitors 49 to 51, a vertical scanning circuit 52, and a horizontal scanning circuit 53. The infrared detectors 22 through 30 are microbolometers having a hollow structure, as described in Japanese Patent Laid-open No. Hei 7-509057, which are made of vanadium oxide or titanic oxide for reducing thermal conductance with respect to the surrounding so that heat quantity of absorbed infrared can be efficiently converted into an increase of temperature of the detector thereby achieving high sensitivity.

In operation, the reference voltage power source 18 outputs a reference voltage corresponding to an operation temperature of the image pickup element 2 to the differential amplifying circuit 19. The differential amplifying circuit 19 compares the supplied output and an output from the element temperature monitor 3 to feed back a power corresponding to the difference between the outputs to the element temperature stabilizing means 9 for stabilizing the operation temperature of the image pickup element 2.

Next, the bias power source 5 supplies bias voltage Vb and gate voltage Vg to the transistors 46 through 48 and the driver circuit 6 sends a driving clock to the vertical scanning circuit 52 according to a timing generated by the timing generation circuit 10 for selection of a row of infrared detectors. In response to the clock, the vertical scanning circuit 52 renders the transistors 31 through 33 conductive for a predetermined period, whereby a bias current defined according to gate voltage Vg is caused to flow into the infrared detectors 22 to 24, so that the voltage corresponding to the respective resistance values will be caused at the infrared detectors 22 through 24.

Subsequently, when a sample-hold clock is applied, the transistors 40 to 42 are made conductive so that the voltage according to the resistance values of the infrared detectors 22 to 24 is temporarily stored in the capacitors 49 to 51. Then, after shutting off the transistors 40 to 42, the horizontal scanning circuit 53 sequentially makes the transistors 43 through 45 conductive so as to output voltage according to the resistance values of the infrared detectors 22 through 24.

Thereafter, the vertical scanning circuit 52 selects the row of infrared detectors 25 through 27 so that the voltage corresponding to the resistance values thereof will be output in the same procedure as that is applied to the infrared detectors 22 through 24.

While repeating the above procedure, voltages corresponding to the resistance values of the infrared detectors 22 through 30 which constitute the image pickup element 2 are sequentially output and, after being amplified in the pre-positioned amplifying circuit 7, are supplied to the A/D converter circuit 13. Then, the timing generation circuit 10 sends a signal for closing the shutter so that the shutter is closed.

After the shutter was closed and consistent infrared were introduced into the infrared detectors 22 through 30, the timing generation circuit 10 sends a signal to the display processing circuit 8, for obtaining offset compensation data for the first time. Then, the A/D converter circuit 13 converts an output from the pre-positioned amplifying circuit 7 into a digital signal. Further, an addition average is obtained for every infrared detector in the addition averaging circuit 14 so that variation of the resistance values of the infrared detectors 22 through 30, in other words, offset variation, is stored in the frame memory 15.

Then, the shutter 4 is opened, and infrared radiation emitting from the direction of subject M is collected in the infrared optical system 1. The converged infrared radiation then passes through the infrared window 21 to form an image on the infrared detectors 22 through 30. This causes a slight increase of the temperatures of the infrared detectors 22 through 30 by an order of a few mK according to the strength of the collected infrared radiation. As a result, the respective resistance values of the infrared detectors are changed from those before the shutter 4 was opened.

Outputs from the infrared detectors 22 through 30 are then amplified in the pre-positioned amplifying circuit 7 and converted into digital signals in the A/D converter circuit 13, similar to when offset compensation data is obtained. Then, the data stored in the frame memory 15 is subtracted from the digital signals for every pixel in the subtraction circuit 16 to remove fixed pattern noise due to offset variation of the infrared detectors, and the result is converted into an analogue video signal in the D/A converting circuit 17 before being output.

Here, a change in the inside temperature of the body 11 due to heat generation of an electric circuit or a change of ambient temperature may change an output voltage of the reference voltage power source 18, characteristics of the element temperature stabilizing means 9, the amount of heat discharged from the image pickup element 2, or the amount of infrared radiation from the infrared optical system 1, resulting in a slight change to an operation temperature of the image pickup element 2. Accordingly, the resistant values of the infrared detectors 22 through 30 are changed for every pixel. Because the amount of change of the resistance value differs for every pixel, offset variation of an output is changed from that at the time when offset compensation data was first obtained, leaving outstanding fixed pattern noise in a video signal. In such a case, offset compensation data is obtained again by operating the offset compensation switch 12 to restore the image.

While the compensation operation described above as being applied to a non-cooling type of infrared camera whose image pickup element 2 has a two-dimensional array of microbolometers and operates as stabilized at a constant temperature around a room temperature, the operation may be similarly applied to a cooled infrared camera whose image pickup element 2 has a two-dimensional array of, for example, platinum and silicon Schottky barrier diodes, and operates as stabilized at a low temperature, including a typical value of around 77 K.

The structure of infrared cameras equipped as described above requires a manual switching operation for offset compensation. Therefore, an operator must stay near the camera, even for a long-time continuous use of the camera.

SUMMARY OF THE INVENTION

The present invention has been conceived to overcome the above problems and aims to provide an infrared camera which can automatically perform offset compensation to remove fixed pattern noise without requiring input or operation.

An infrared camera of the present invention comprises an offset compensation execution signal generation circuit for automatically generating an offset compensation execution signal, and a shutter arranged at a position covering the viewing field of the image pickup element.

With this arrangement, the shutter is closed according to an offset compensation execution signal automatically and periodically generated by the offset compensation signal generation circuit before carrying out offset compensation. This enables automatic offset operation without requiring an operator to manipulate the camera.

An infrared camera of the present invention may also comprise an offset compensation execution signal generation circuit for automatically generating an offset compensation execution signal, and a de-focus motor associated with an infrared optical system.

With this arrangement, the de-focus motor is operated based on an offset compensation execution signal which is automatically and periodically generated by the offset compensation signal generation circuit, to move the focusing plane of the infrared optical system for carrying out offset compensation. This enables automatic offset operation without requiring an operator.

An infrared camera of the present invention may further comprise an offset compensation execution signal generation circuit for outputting an offset compensation execution signal at a constant interval.

Further, an infrared camera of the present invention may comprise an offset compensation execution signal generation circuit for outputting an offset compensation execution signal in a shorter interval than the above mentioned constant interval during a predetermined period immediately after turning on the power.

With this arrangement, there can be provided an infrared camera which can produce a preferable image, even immediately after being powered up.

According to an infrared camera of the present invention, the offset compensation execution signal generation circuit may have a temperature sensor for measuring temperature around the structural elements of the infrared camera, and a temperature changing amount judging circuit connected to the temperature sensor.

With this arrangement, an offset compensation is applied when the temperature around the structural elements of the infrared camera has been changed by more than a predetermined value from the temperature at the time of previous execution of offset compensation. This enables production of an infrared camera which can produce a preferable image even during a period immediately after having turned on the power or when the temperature around the structural elements of the camera is changed while capturing an image.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENTS

Embodiment 1

Figure 1:
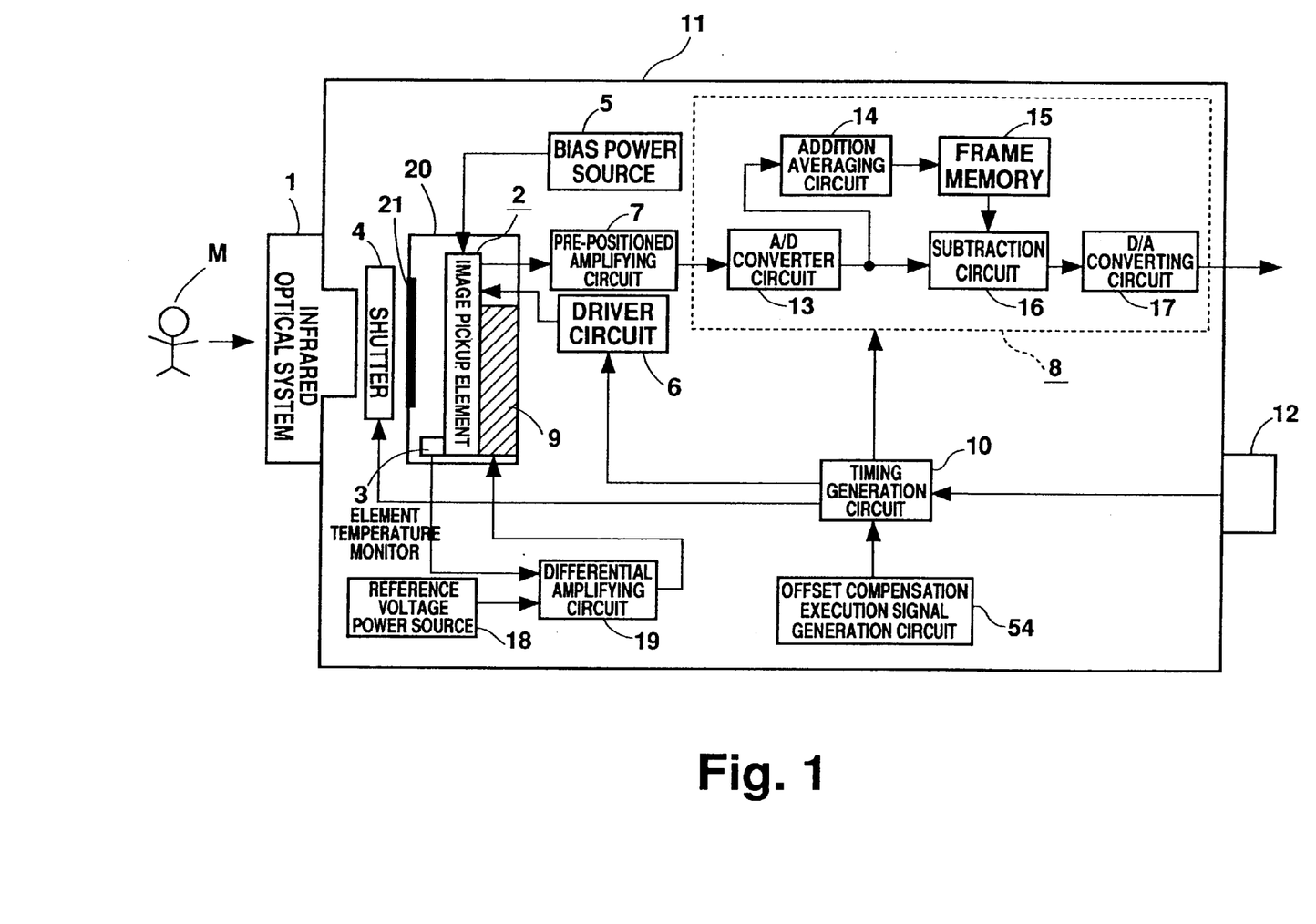
FIG. 1 is a block diagram showing a structure of an infrared camera according to a first preferred embodiment of the present invention.

FIG. 1 is a block diagram showing an infrared camera according to a first preferred embodiment of the present invention. The respective members 1 to 21 correspond to members described above for an infrared camera of the related art. The drawing additionally shows an offset compensation execution signal generation circuit 54 connected to the timing generation circuit 10.

Operation of an infrared camera according to the present invention will next be described. Identical operations to those for an infrared camera of the related art will be applied from stabilization of the operation temperature of the image pickup element 2 at a desired temperature through operation of the element temperature stabilizing means 9, through first-time automatic offset compensation, to output of a video signal from the D/A converter 17.

Figure 2:
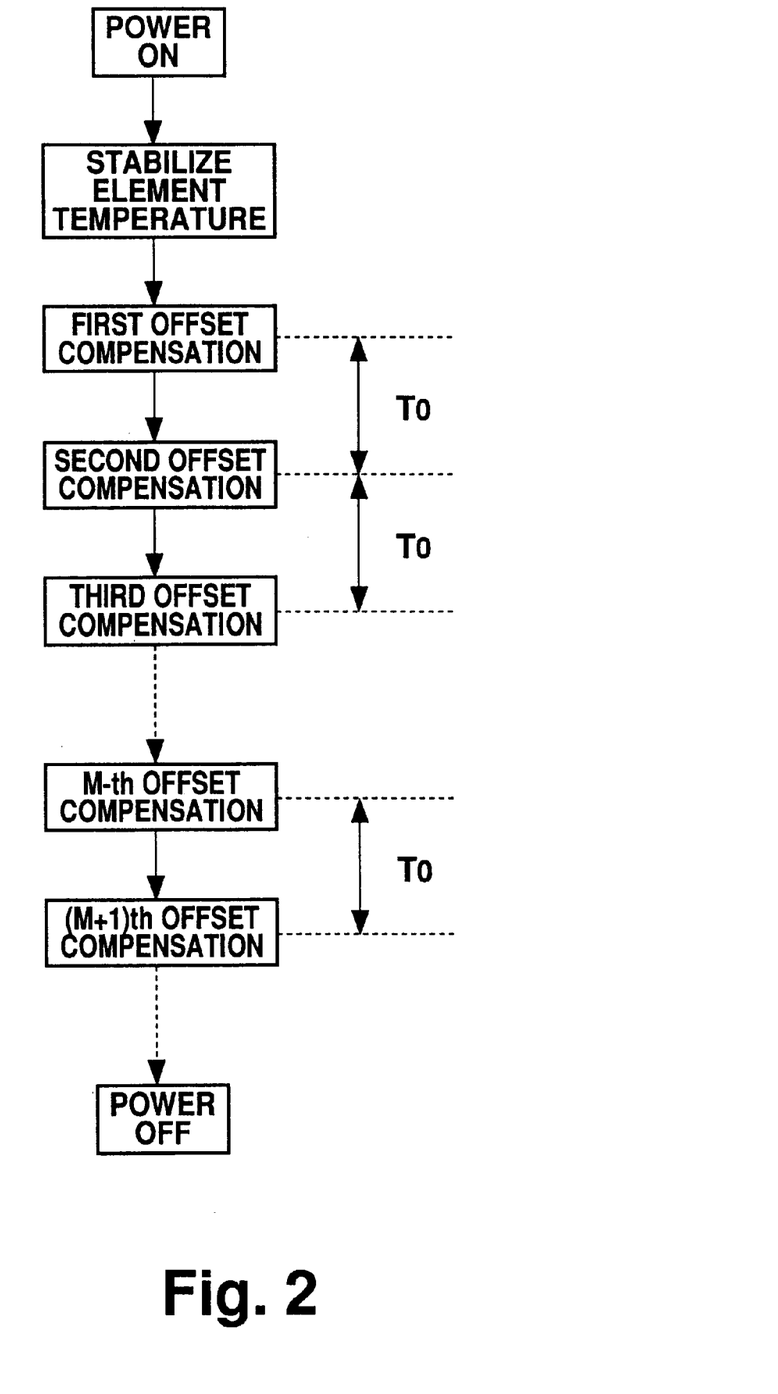
FIG. 2 is a diagram relative to an operation of the infrared camera according to the first preferred embodiment of the present invention.

FIG. 2 illustrates an operation of an infrared camera of the present embodiment. Specifically, during a predetermined period after execution of first offset compensation, the offset compensation execution signal generation circuit continues periodical output of an offset compensation execution signal to a timing generation circuit 10 in an interval To for performing automatic repetitive offset compensation. In addition to the automatic offset compensation, manual offset compensation may be applied if necessary by operating an offset compensation execution switch 12. In this case, the next offset compensation may be applied after an interval To following the manual offset compensation, or following the last automatic offset compensation in ignorance of the manual offset compensation.

Embodiment 2

Figure 3:
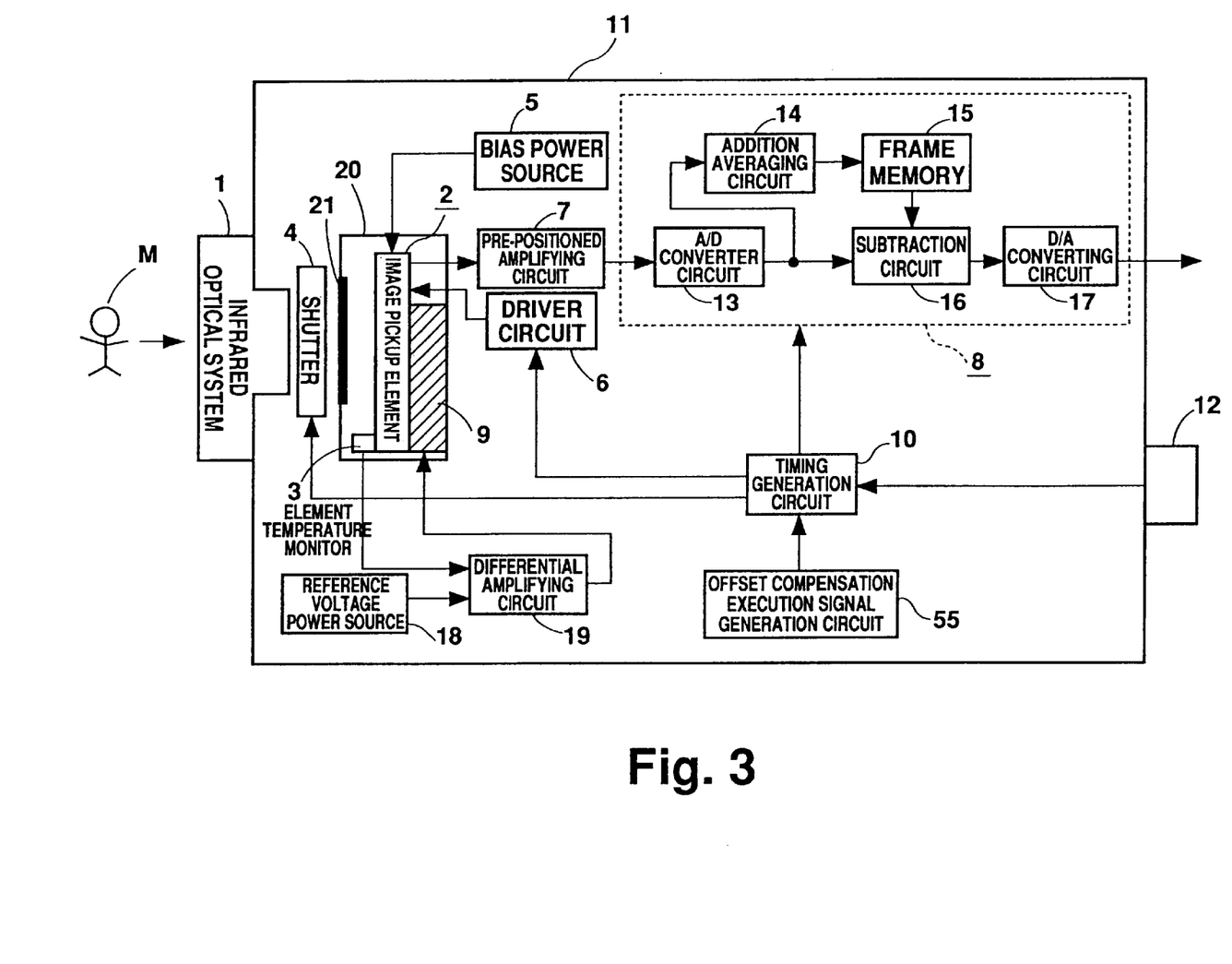
FIG. 3 is a block diagram showing a structure of an infrared camera according to a second preferred embodiment of the present invention.

FIG. 3 is a block diagram showing an infrared camera according to a second preferred embodiment of the present invention. The respective members 1 to 21 correspond to those described above. The drawing additionally shows an offset compensation execution signal generation circuit 55 connected to the timing generation circuit 10.

Figure 4:
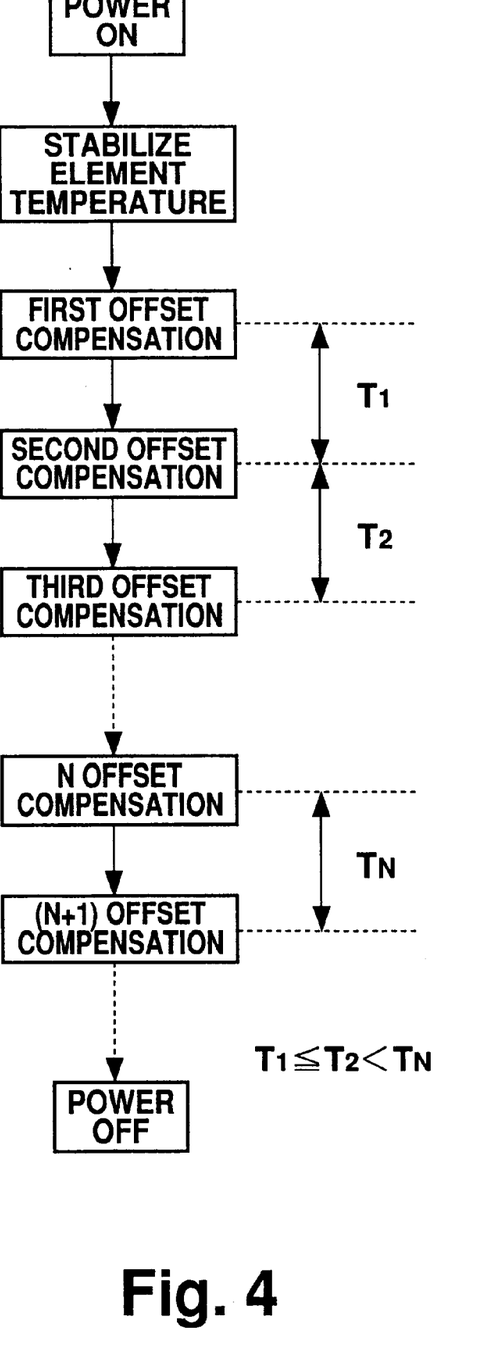
FIG. 4 is a diagram relative to an operation of the infrared camera according to the second preferred embodiment of the present invention.

FIG. 4 shows operation of the infrared camera of this embodiment. Identical operations to those for an infrared camera of the related art will be applied from stabilization of the operation temperature of the image pickup element 2 at a desired temperature through operation of the element temperature stabilizing means 9, through first-time automatic offset compensation, to output of a video signal from the D/A converter 17.

The temperature of the inside of the body 11 generally increases rapidly one to two hours after power is turned on due to heat generation of an electronic circuit, and thereafter gradually attains balanced condition. Therefore, a great deal of fixed pattern noise will be caused in a unit immediately after power is supplied. To address this problem, an offset compensation execution signal as shown in FIG. 4 is applied from the offset compensation execution signal generation circuit to the timing generation circuit 10 so that offset compensation will be executed in a shorter interval after power is turned on in order to suppress fixed pattern noises and thereby produce a preferable image. Note that, in addition to the automatic offset compensation which is carried out in an interval set as described above, manual offset compensation may be applied by operating an offset compensation execution switch 12.

Embodiment 3

Figure 5:
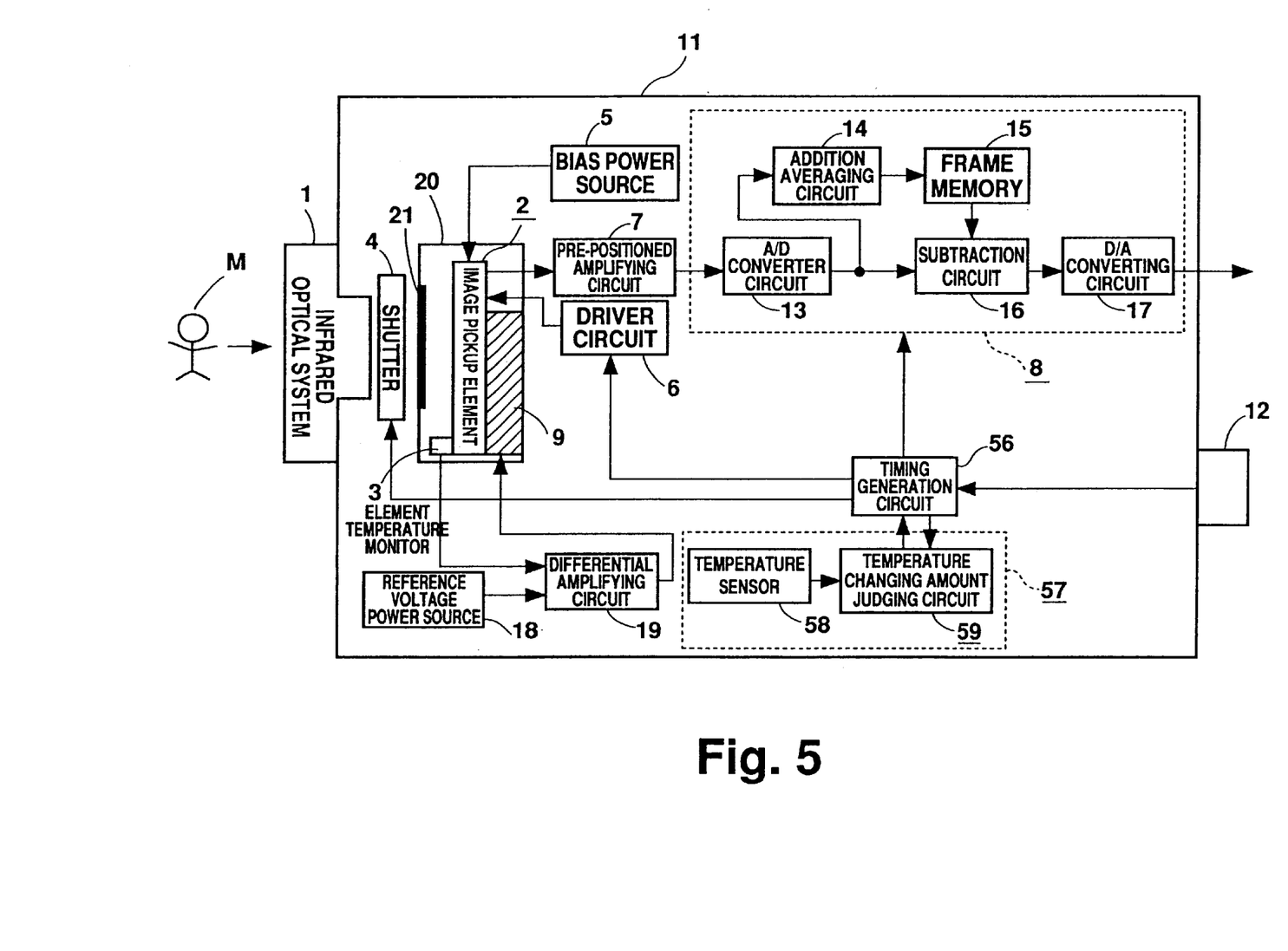
FIG. 5 is a block diagram showing a structure of an infrared camera according to a third preferred embodiment of the present invention.

FIG. 5 is a block diagram showing an infrared camera according to a third preferred embodiment of the present invention. The respective members 1 to 21 correspond to those members identified above using the same numerals. The drawing additionally shows a timing generation circuit 56, and an offset compensation execution signal generation circuit 57 connected to the timing generation circuit 56. The offset compensation execution signal generation circuit 57 comprises a temperature sensor 58 arranged in the inside of the body 11, for measuring the temperature around the structural elements of the infrared camera, and a temperature changing amount judging circuit 59 connected to the temperature sensor 58.

Figure 6:
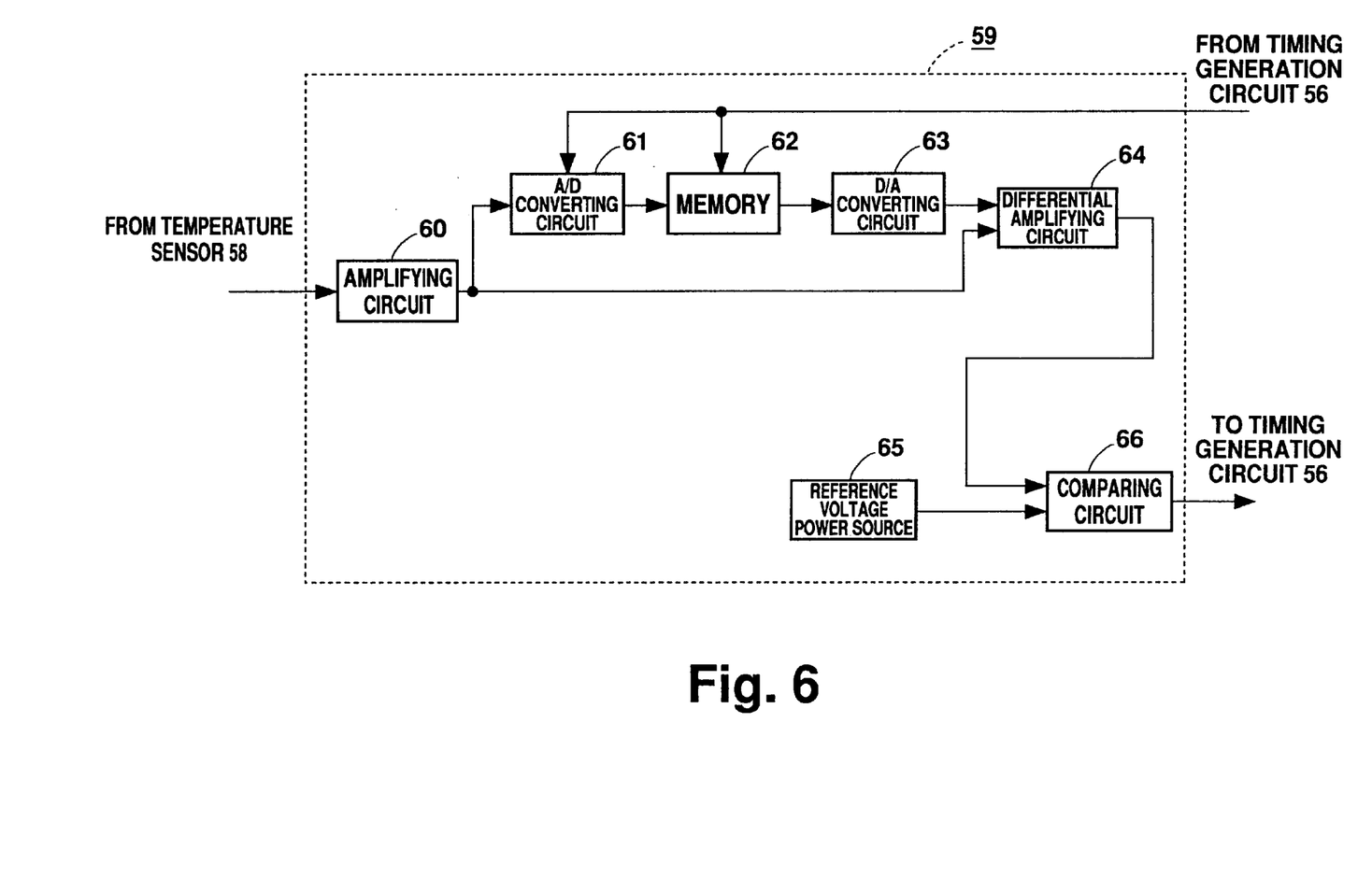
FIG. 6 is a block diagram showing a structure of a temperature changing amount judging circuit according to the third preferred embodiment of the present invention.

FIG. 6 is a block diagram showing a structure of a temperature changing amount judging circuit 59, which comprises an amplifying circuit 60, an A/D converter circuit 61, a memory 62, a D/A converter circuit 63, a differential amplifying circuit 64 connected to the amplifying circuit 60 and the D/A converter circuit 63, and a comparing circuit 66 connected to the differential amplifying circuit 64 and a reference voltage power source 65.

Operation of an infrared camera according to the present invention will be described. Identical operations to those for an infrared camera of the related art will be applied from stabilization of the operation temperature of the image pickup element 2 at a desired temperature through operation of the element temperature stabilizing means 9, through first-time automatic offset compensation, to output of a video signal from the D/A converter 17.

In an infrared camera according to this embodiment, an output of the temperature sensor 58 at the time of performing offset compensation is amplified by the amplifying circuit 60, and then converted into a digital signal in the A/D converting circuit 61 to be stored in the memory 62. The digital signal is then converted into an analogue signal in the D/A converting circuit 63, and supplied to the differential amplifying circuit 64. Meanwhile, an output from the temperature sensor 58 while taking an image after offset compensation, is also supplied to the differential amplifying circuit 64 so that a difference between this output and an output from the D/A converting circuit 63, i.e., a change of an output from the temperature sensor 58 from that at the time of performing last offset compensation, is supplied to the comparing circuit 66. When the amount of change exceeds a value set according to the reference voltage power source 65, an offset compensation execution signal is output to the timing generation circuit 56 for execution of another offset compensation.

Subsequently, after completion of the offset compensation, the timing generation circuit 56 sends a signal for newly obtaining an output from the temperature sensor 58 to the temperature changing amount judging circuit 59 for updating outputs of the memory 62 and the D/A converting circuit 63.

Figure 7:
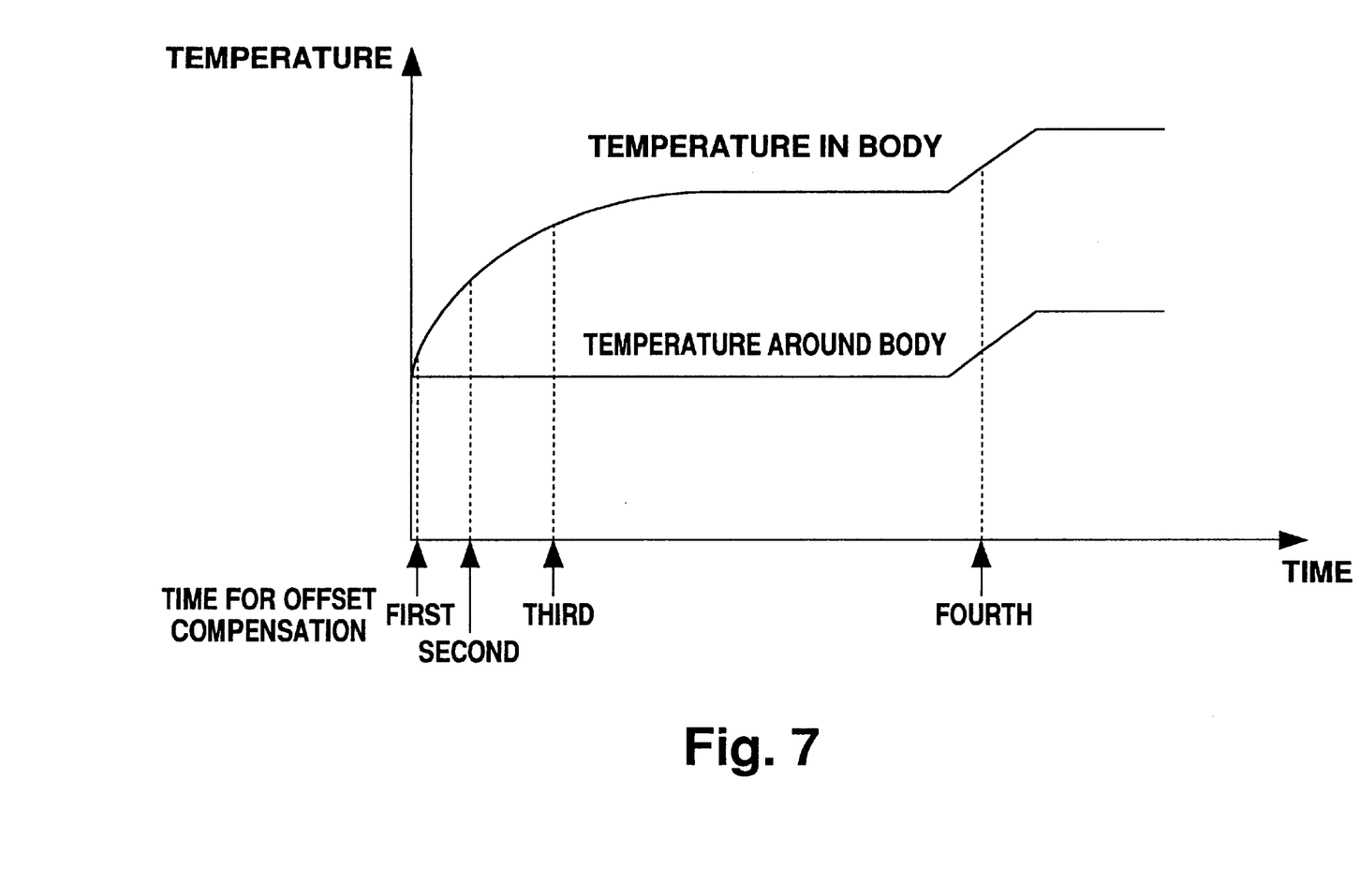
FIG. 7 is a diagram illustrating an operation of the infrared camera according to the third preferred embodiment of the present invention.

FIG. 7 is a diagram showing example operation of an infrared camera according to the present embodiment, in which offset compensation is automatically applied immediately after turning on the power or at the time when the temperature around the body 11 is changed, for suppressing generation of fixed pattern noises. Note that, in addition to the automatic offset compensation, manual offset compensation may be applied upon necessity by operating the offset compensation execution switch 12.

Embodiment 4

Figure 8:
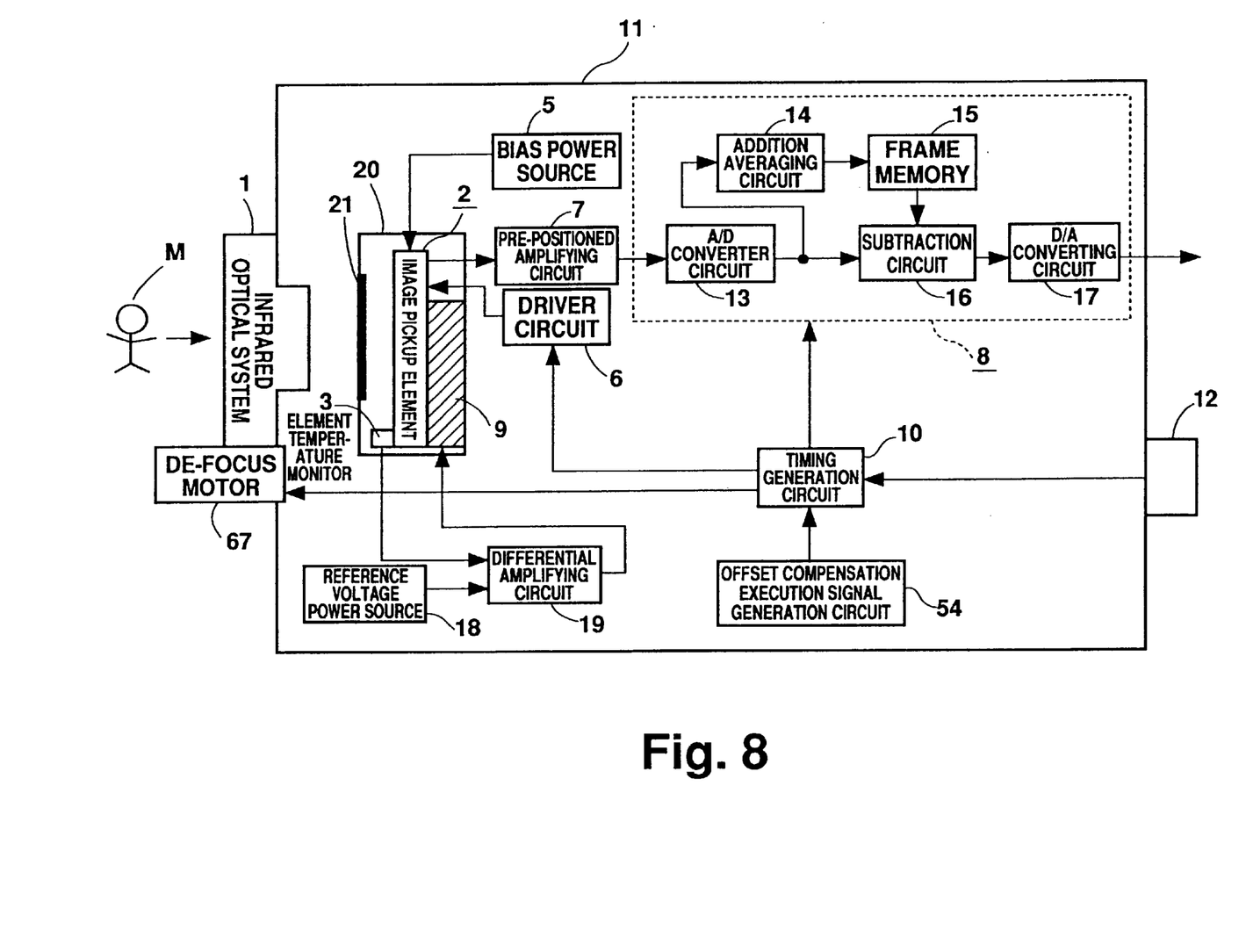
FIG. 8 is a block diagram showing a structure of an infrared camera according to a fourth present invention.

FIG. 8 is a block diagram showing an infrared camera according to a fourth preferred embodiment of the present invention. The respective members 1 to 3 and 5 to 21 correspond to those described above, and the member 54 is identical to that employed in the first preferred embodiment of the present invention. The drawing additionally shows a de-focus motor 67 associated with the infrared optical system 1.

Operation of an infrared camera according to the present embodiment will be described. Identical operations to those for an infrared camera of the related art will be applied from stabilization of the operation temperature of the image pickup element 2 at a desired temperature through operation of the element temperature stabilizing means 9, through first-time automatic offset compensation, to output of a video signal from the D/A converter 17.

After first offset compensation, the offset compensation execution signal generation circuit 54 periodically outputs, an offset compensation execution signal, similar to the first embodiment, to the timing generation circuit 10. The timing generation circuit 10 then sends an operating signal to the de-focus motor 67 for activation, instead of closing the shutter 4, to move the focusing plane for attaining an out-of-focus state so that infrared can be constantly introduced into the infrared detectors 22 to 30.

In such a situation, the timing generation circuit 10 sends a signal for obtaining offset compensation data to the display processing circuit 8 so that an output voltage of the infrared detectors 22 to 30 is stored in the frame memory 15 as offset compensation data, similar to a conventional infrared camera. The de-focus motor 67 is then activated again so that the image of the subject M is formed on the infrared detectors 22 to 30. Subsequently, offset variation with the infrared detectors 22 to 30 is removed by the subtraction circuit 16, and the signal is converted into an analog video signal by the D/A converter circuit 17 before being output.

What is claimed is:

1. An infrared camera comprising:
   an infrared optical system;
   an image pickup element;
   element temperature stabilizing means thermally connected to the image pickup element;
   a shutter positioned covering a viewing field of the image pickup element;
   a bias power source connected to said image pickup element;
   a driver circuit connected to said image pickup element;
   a pre-positioned amplifying circuit connected to said image pickup element;
   a display processing circuit connected to said pre-positioned amplifying circuit;
   a timing generation circuit connected to said shutter, said driver circuit, and said display processing circuit;
   manual offset compensation switch connected to said timing generation circuit; and
   an automatic offset compensation execution signal generation circuit connected to said timing generation circuit.

2. An infrared camera according to claim 1, wherein said automatic offset compensation execution signal generation circuit outputs an offset compensation execution signal at predetermined intervals.

3. An infrared camera according to claim 1, wherein said automatic offset compensation execution signal generation circuit outputs an offset compensation execution signal and wherein the interval at which said offset compensation execution signal output is shorter during a predetermined time period after power is turned on than during a period after the predetermined time period.

4. An infrared camera according to claim 1, wherein said automatic offset compensation execution signal generation circuit includes a temperature sensor for measuring the temperature around structural elements of said infrared camera, and a temperature changing amount judging circuit connected to said temperature sensor.

5. An infrared camera, comprising:
   an infrared optical system;
   de-focusing means associated with said infrared optical system;
   an image pickup element;
   element temperature stabilizing means thermally connected to said image pickup element;
   a bias power source connected to said image pickup element;
   a driver circuit connected to said image pickup element;
   a pre-positioned amplifying circuit connected to said image pickup element;
   a display processing circuit connected to said pre-positioned amplifying circuit;
   a timing generation circuit connected to said de-focusing means, said driver circuit, and said display processing circuit;
   manual offset compensation switch connected to said timing generation circuit; and
   an automatic offset compensation execution signal generation circuit connected to said timing generation circuit.

6. An infrared camera according to claim 5, wherein said automatic offset compensation execution signal generation circuit outputs an offset compensation execution signal at predetermined intervals.

7. An infrared camera according to claim 5, wherein said automatic offset compensation execution signal generation circuit outputs an offset compensation execution signal and wherein the interval at which said offset compensation execution signal output is shorter during a predetermined time period after power is turned on than during a period after the predetermined time period.

8. An infrared camera according to claim 5, wherein said automatic offset compensation execution signal generation circuit includes a temperature sensor for measuring the temperature around structural elements of said infrared camera, and a temperature changing amount judging circuit connected to said temperature sensor.

9. An infrared camera comprising:
   an infrared optical system;
   an image pickup element;
   element temperature stabilizing means thermally connected to the image pickup element;
   a shutter positioned covering a viewing field of the image pickup element;
   a bias power source connected to said image pickup element;
   a driver circuit connected to said image pickup element;
   a pre-positioned amplifying circuit connected to said image pickup element;
   a display processing circuit connected to said pre-positioned amplifying circuit;
   a timing generation circuit connected to said shutter, said driver circuit, and said display processing circuit; and
   an offset compensation execution signal generation circuit connected to said timing generation circuit;
   wherein said offset compensation execution signal generation circuit outputs an offset compensation execution signal and wherein the interval at which said offset compensation execution signal output is shorter during a predetermined time period after power is turned on than during a period after the predetermined time period.

10. An infrared camera, comprising:
    an infrared optical system;
    de-focusing means associated with said infrared optical system;
    an image pickup element;
    element temperature stabilizing means thermally connected to said image pickup element;
    a bias power source connected to said image pickup element;

a driver circuit connected to said image pickup element;

a pre-positioned amplifying circuit connected to said image pickup element;

a display processing circuit connected to said pre-positioned amplifing circuit;

a timing generation circuit connected to said de-focusing means, said driver circuit, and said display processing circuit; and an offset compensation execution signal generation circuit connected to said timing generation circuit;

wherein said offset compensation execution signal generation circuit outputs an offset compensation execution signal and wherein the interval at which said offset compensation execution signal output is shorter during a predetermined time period after power is turned on than during a period after the predetermined time period.

11. An infrared camera comprising:

an infrared optical system;

an image pickup element;

element temperature stabilizing means thermally connected to the image pickup element;

a shutter positioned covering a viewing field of the image pickup element;

a bias power source connected to said image pickup element;

a driver circuit connected to said image pickup element;

a pre-positioned amplifying circuit connected to said image pickup element;

a display processing circuit connected to said pre-positioned amplifying circuit;

a timing generation circuit connected to said shutter, said driver circuit, and said display processing circuit; and an offset compensation execution signal generation circuit connected to said timing generation circuit wherein said offset compensation execution signal generation circuit includes a temperature sensor for measuring the temperature around structural elements of said infrared camera, and a temperature changing amount judging circuit connected to said temperature sensor, and said temperature changing amount judging circuit has a memory for storing a temperature at execution of offset compensation and updates content of the memory every execution of offset compensation.

12. An infrared camera, comprising:

an infrared optical system;

de-focusing means associated with said infrared optical system;

an image pickup element;

element temperature stabilizing means thermally connected to said image pickup element;

a bias power source connected to said image pickup element;

a driver circuit connected to said image pickup element;

a pre-positioned amplifying circuit connected to said image pickup element;

a display processing circuit connected to said pre-positioned amplifying circuit;

a timing generation circuit connected to said shutter, said driver circuit, and said display processing circuit; and an offset compensation execution signal generation circuit connected to said timing generation circuit wherein said offset compensation execution signal generation circuit includes a temperature sensor for measuring the temperature around structural elements of said infrared camera, and a temperature changing amount judging circuit connected to said temperature sensor, and said temperature changing amount judging circuit has a memory for storing a temperature at execution of offset compensation and updates content of the memory every execution of offset compensation.

* * * * *